United States Patent [19]
Peters

[11] Patent Number: 4,735,718
[45] Date of Patent: Apr. 5, 1988

[54] MULTILAYER MEMBRANE SEPARATOR

[75] Inventor: Joseph E. Peters, Carlisle, Mass.

[73] Assignee: Millipore Corporation, Bedford, Mass.

[21] Appl. No.: 676,205

[22] Filed: Nov. 28, 1984

Related U.S. Application Data

[63] Continuation of Ser. No. 491,503, May 4, 1983, abandoned.

[51] Int. Cl.<sup>4</sup> .............................................. B01D 13/00
[52] U.S. Cl. ............................ 210/321.75; 210/433.2; 210/321.84
[58] Field of Search ...................... 210/321, 433.2, 487, 210/493.2; 422/48; 55/158

[56] References Cited

U.S. PATENT DOCUMENTS 3,401,798 9/1968 Nyrop ............................ 210/487 X
3,925,037 12/1975 Ward, III et al. ............ 210/321.1 X
4,324,658 4/1982 Esmond ............................ 210/321.3

OTHER PUBLICATIONS

Millipore Catalogue and Purchasing Guide, 1978/1979, Cat. No. MC179/v, Apr. 1978, Millipore Corp., Bedford, Mass., p. 11.

Primary Examiner—David Sadowski
Attorney, Agent, or Firm—Andrew T. Karnakis; Paul J. Cook

[57] ABSTRACT

A multilayer membrane separator which permits serial and tangential contact of a retentate with a plurality of membranes within the separator. The separator is formed from a plurality of contiguous separator units each consisting of two membrane layers, two retentate layers, a filtrate spacer layer and two adhesive layers. The adhesive layers, in cooperation with a liquid inlet to the separator and a liquid outlet from the separator effect the desired retentate flow and prevent mixing of retentate and filtrate.

3 Claims, 3 Drawing Sheets

MULTILAYER MEMBRANE SEPARATOR

This is a continuation of co-pending application Ser. No. 491,503, filed on May 4, 1983, now abandoned.

BACKGROUND OF THE INVENTION

This invention relates to a method and apparatus for concentrating high molecular weight materials in an aqueous medium or for harvesting cells from an aqueous medium.

There is available at the present time, a device for concentrating high molecular weight materials in an aqueous medium by utilizing ultrafiltration membranes arranged in a configuration which effects tangential flow across the membranes while allowing the desired separation to occur. Such a device is available from Millipore Corporation and identified as the Pellicon ® cassette system. The assembly contains a plurality of repeating units each of which consists of two separator screens and two filters alternately layered. Entrance and exit ports are provided that permit tangential flow across the filter surface and permit separate recovery of a filtrate and a retentate. A plurality of repeating units are maintained in the desired configuration by being sandwiched between an upper and a lower gasket and held together by pressure. The screens which contact both surfaces of each filter function to provide a relatively open pathway for incoming aqueous medium and for the filtrate so that the incoming aqueous medium passes tangentially over the filter surface while allowing the filtrate to pass through the membrane and out of the assembly and allowing the retentate to be removed from the assembly by means separate from the filtrate output means. In addition, the presently available separation assembly provides only parallel flow of the incoming aqueous medium simultaneously across plurality of filter surfaces.

While presently available separation assemblies have been satisfactory for most purpose, it has found that the screens in the assembly which contact the incoming aqueous medium can become clogged with particulate matter. The resultant blockage requires that the pressure of the incoming stream be increased to compensate for the pressure drop caused by the entrapped particles. The increased pressure can cause malfunction of the assembly due to separation of the assembly elements or rupture of the filter layer. In addition, the use of the screen to separate filter layers does not permit adjustment of the open space between adjacent filter layers so that the wall shear forces on the incoming liquid passing through the space between the two filter layers can not be adjusted. In addition, tangential flow of incoming liquid into a single space between two adjacent filter layers, as in the case of present parallel flow devices, does not permit substantially complete filtration of the incoming liquid due to the short residence time of the incoming liquid in contact with the filter layer. In contrast, it would be desirable to provide a means for easily controlling the wall shear forces on incoming liquid while preventing entrapment of the particles in the incoming liquid. Furthermore, it would be desirable to provide such a means which permits incoming liquid to serially contact a plurality of filter layers.

SUMMARY OF THE INVENTION

This invention provides a multilayer membrane separator comprising a plurality of contiguous membrane units each of which consists of two membrane layers, two retentate spacer layers, two adhesive layers and a filtrate spacer layer. Within each membrane unit, the filtrate spacer layer is positioned between the adhesive layers each of which, in turn, are positioned contiguous to a filtrate surface of one of the filter layers. Each of the retentate spacer layers is positioned contiguous to the retentate surface of one of the filter layers. The adhesive layers are bonded to the filtrate layers in a pattern so that filtrate and retentate are not mixed during filtration while the retentate is serially contacted with a plurality of filter layers within the assembly. Each of the retentate spacer layers is provided with a plurality of parallel channels that direct liquid flow tangentially across the filter surfaces to a retentate outlet which then directs the retentate to the next adjacent retentate spacer for further filtration. The filtrate is directed through the filtrate screen to a filtrate outlet. The separator of this invention is provided with an inlet for the aqueous medium to be filtered and separate outlets for the filtrate and the retentate. The channels in the retentate spacer layers typically have a height between about 0.2 mm and 0.7 mm, a length between about 50 mm and 70 mm and a width between about 10 mm and 30 mm.

DESCRIPTION OF SPECIFIC EMBODIMENTS

Figure 1:
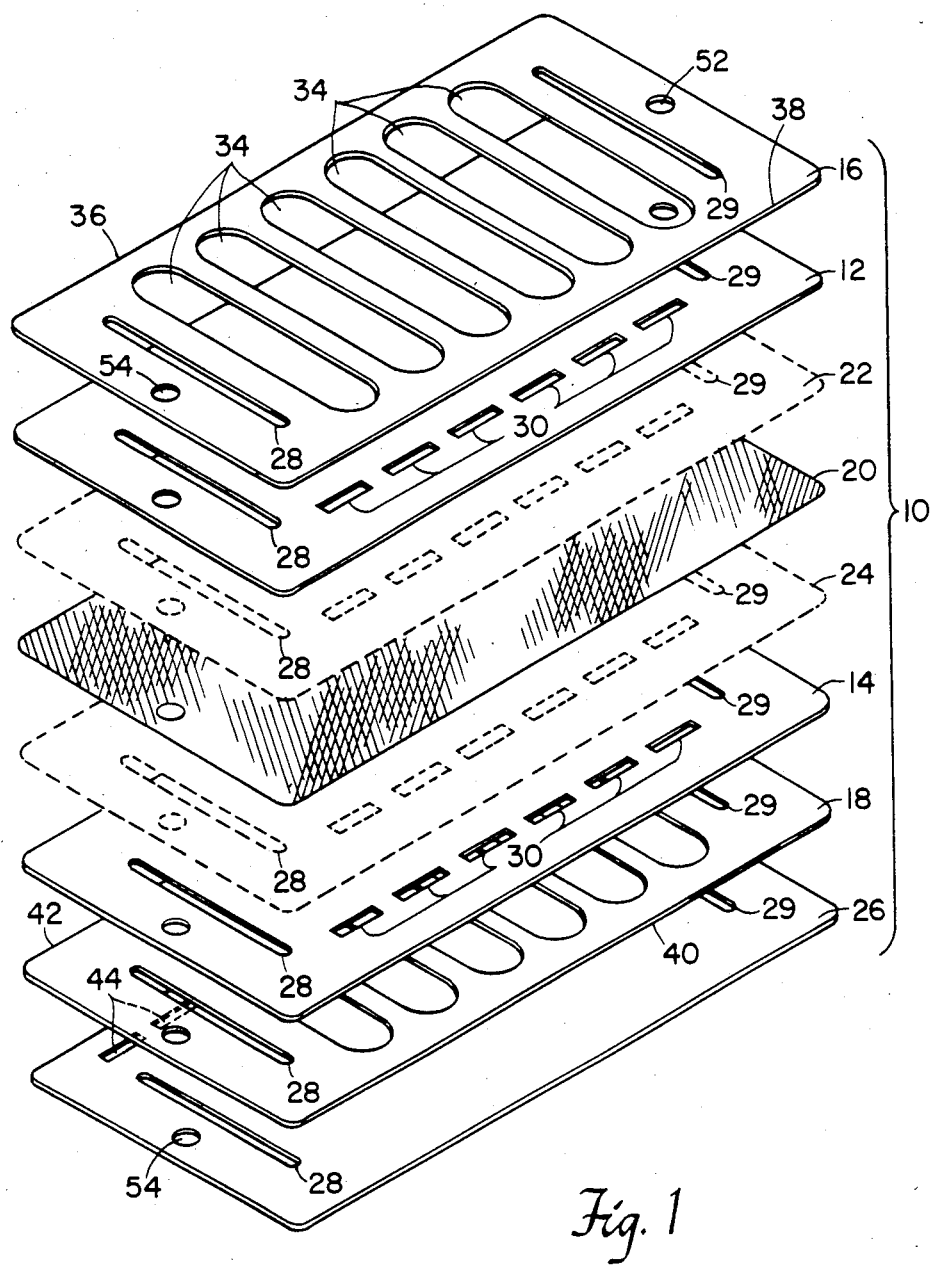
FIG. 1 is an exploded view of the separator elements of the apparatus of this invention.
Figure 2:
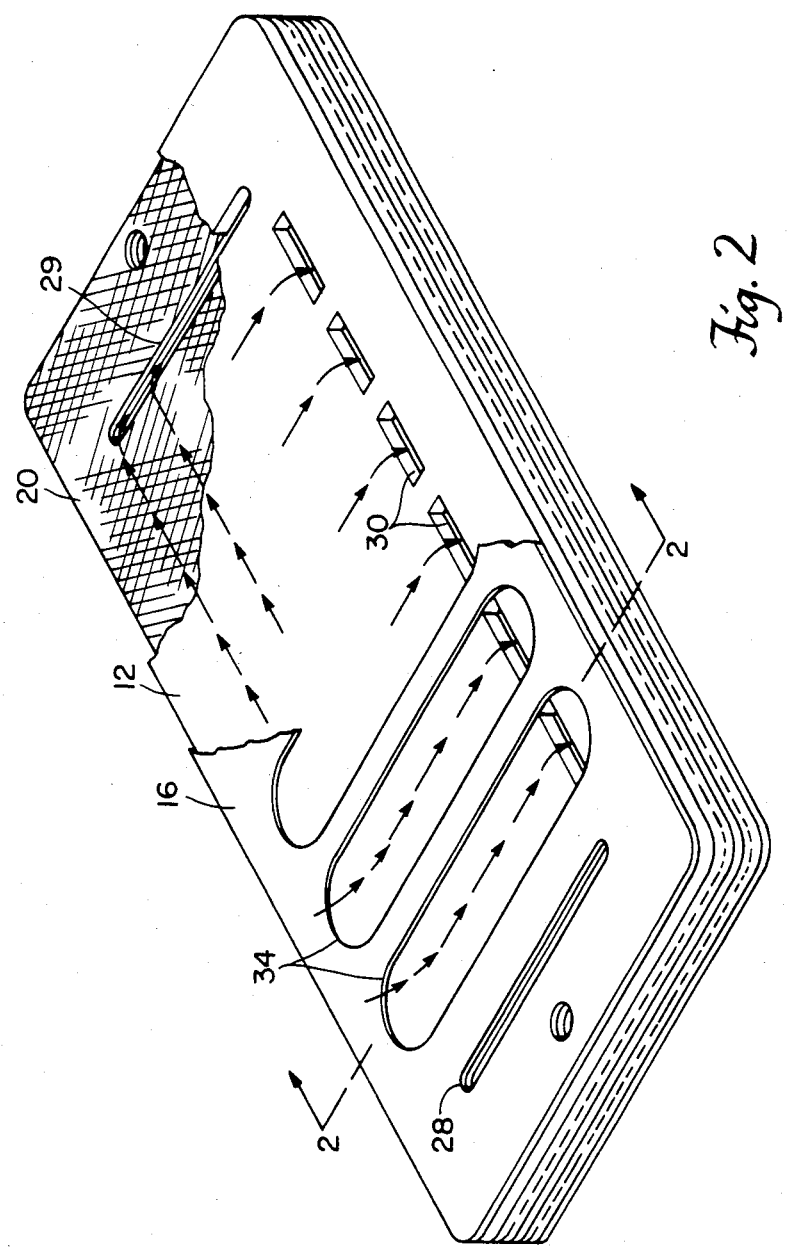
FIG. 2 is a top view of the separator elements of FIG. 1 in contiguous relationship showing flow of retentate and filtrate.
Figure 3:
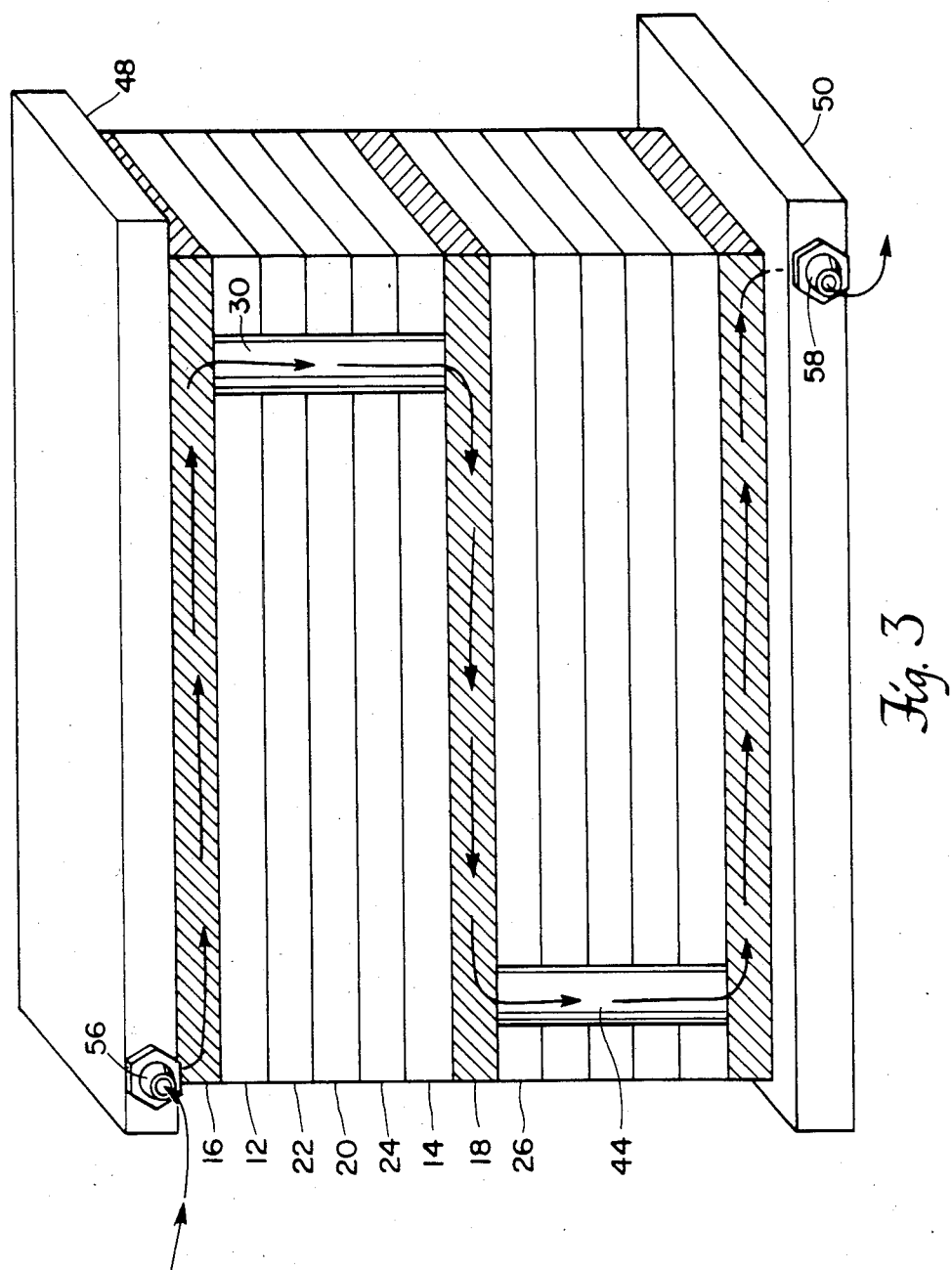
FIG. 3 is a cross sectional view of the separator elements of FIG. 2 taken along line 2—2 and housed between two manifolds.

As shown in FIGS. 1 through 3, the separator unit 10 comprises, a first membrane 12, a second membrane 14, a first retentate spacer 16, a second retentate spacer 18, a filtrate spacer 20, a first adhesive layer 22 and a second adhesive layer 24. A filter layer 26 is shown which comprises the first membrane of a separator unit (not shown) positioned adjacent the separation unit 10. Both the first membrane 12 and the second membrane 14 are of identical construction and are formed from a pliable hydrophilic microporous filter or ultrafilter material having an average pore size extending from about 0.001 micrometers to about 1.0 micrometer, currently marketed by Millipore Corporation and identified as MF-Millipore ®, Celotate ®, Durapore ® (Hydrophilic) filters, Duralon ® filter, Polyvic ® filters, Solveret ® filters, Microweb ® filters, Pellicon ® ultrafilters or the like. Each membrane 12 and 14 is provided with a widthwide channel 28. The widthwise channels 28 and 29 are not in fluid communication with the row of lengthwise channels 30. The first spacer 16 comprises of plurality of channels 34 which extend from adjacent edge 36 to edge 38 and intersect the end of channels 30. When membranes 12 and 14 are contiguous to spacers 16 and 18 respectively, the channels 28 and 29 coincide with the corresponding channels 28 and 29 on the spacers 16 and 26 and on the adhesive layers 22 and 24. The second retentate spacer 18 also is provided with a plurality of channels which extend from adjacent edge 40 to edge 42 and intersect a row of channels 44 that are positioned in the same manner as the row of channels 30 but on the opposite side of the separator unit 10. The adhesive layers 22 and 24 serve to prevent admixture of filtrate and retentate. The adhesive in the adhesive layers 22 and 24 are activated conveniently by heat. The adhesive causes adherence of membranes 12 and 14, spacer layer 20, and adhesive layers 22 and 24. The adhesive serves to block channels 30 and 44 from the filtrate and to prevent filtrate from exiting between the lateral edge of the membranes 12 and 14 and spacer 20. Thus, the filtrate can be removed from the separator unit 10 through channels 28 and 29. The adhesive does not block communication between channels 34, 30, 44 and 45 so that retentate passes only through this pathway. The entire separation unit is secured between manifold plates 48 and 50 and by bolts which extend the entire thickness of the separation unit 10. The manifold plate 48 is provided with a liquid inlet 56 and the manifold plate 50 is provided with retentate outlet 58. The apparatus of this invention can include any convenient number of separator units 10 so long as the overall pressure drop within the separator apparatus does not adversely interfere with the filtration or cause damage in the apparatus. Typically, the apparatus of the invention includes 1 to 11 separator units 10. The liquid flow paths of filtrate and retentate are shown in FIGS. 2 and 3.

The channels 34 in retentate spacers 16 and 18 can have a particular height, width and length depending upon the aqueous medium being processed in order to control the wall shear rate within the channels and pressure drop within the separator unit. Accordingly, the channels 34 can have a height between about 0.2 mm and about 0.7 mm, preferably between about 0.3 mm and 0.5 mm. Furthermore, the channels 34 can have a cumulative width between about 6.0 cm and about 9.0 cm, an individual width between about 0.6 cm and 1.0 cm and a length between about 6.0 cm and about 6.3 cm, preferably a cumulative width between about 70 cm and about 75 cm, for all of the channels in all of the spacers 16 and 18, an individual width between about 0.7 cm and 0.8 cm, and a length between about 6.0 cm and about 6.3 cm. It has been found that when utilizing typical flow rates of incoming aqueous medium of between about 500 and 1000 ml/min, a typical inlet pressure, between about 7 and about 15 psig, utilization of a spacer having the channel size of this invention, shear rates of between 2000 and 10,000 sec.$^{-1}$ can be obtained. The apparatus of this invention is particularly useful for processing proteins, virus, bacteria or eukaryotic cell, liquid compositions.

I claim:

1. Apparatus suitable for filtering a liquid composition said apparatus having a primary inlet for said liquid composition, a primary outlet to remove filtrate from said liquid composition and a secondary outlet to recover retentate from said liquid composition which comprises:

at least two membrane units, each of said membrane units consisting of a first membrane layer, a second membrane layer, a filtrate spacer layer interposed between said first and second membrane layers, a first adhesive layer interposed between and contiguous to said first membrane layer and said spacer layer, and a second adhesive layer interposed between and contiguous to said second membrane layer and said spacer layer, a first retentate spacer in direct contact with said first membrane on a membrane surface opposite a membrane surface in contact with said spacer layer and a second retentate spacer in direct contact with said second membrane on a membrane surface opposite a membrane surface in contact with said spacer layer, each of said retentate spacers having a plurality of channels each having an inlet end and an outlet end and adapted to provide flow of said liquid composition in said channels tangentially across said membrane layers contacting said retentate spacers, inlet means for introducing said liquid composition into the inlet ends of channels of said first retentate spacer to effect liquid flow in a first direction across said first membrane layer, a row of membrane channels in said first membrane layer in liquid communication with the outlet ends of the channels of said first retentate spacer, the row of membrane channels being in liquid communication with the inlet ends of the row of channels in said second retentate spacer through channels in said adhesive layer and channels in said second membrane layer thereby to effect liquid flow across said second membrane layer in a direction opposite said first direction of liquid flow across said first membrane layer, an outlet means for removing filtrate passed through said first membrane and said second membrane and through said filtrate spacer layer separately from retentate, and outlet means for removing said liquid composition from the outlet ends of said second retentate spacer, said adhesive layers providing seals to prevent admixture of filtrate with retentate.

2. The apparatus of claim 1 wherein said channels in said retentate spacers have a height between about 0.2 mm and 0.7 mm.

3. The apparatus of claim 1 wherein the membrane layers are microporous filters, ultrafilters or reverse osmosis membranes having an average pore size between about 0.001 micrometers and 1.0 micrometers.

* * * * *